United States Patent
Li et al.

(10) Patent No.: US 12,334,739 B2
(45) Date of Patent: Jun. 17, 2025

(54) HYBRID DIRECT CURRENT TRANSMISSION SYSTEM AND CONTROL METHOD THEREOF

(71) Applicant: Inner Mongolia University of Technology, Hohhot (CN)

(72) Inventors: Hua Li, Hohhot (CN); Tianlong Hong, Hohhot (CN)

( * ) Notice: Subject to any disclaimer, the term of this patent is extended or adjusted under 35 U.S.C. 154(b) by 0 days.

(21) Appl. No.: 19/024,817

(22) Filed: Jan. 16, 2025

(65) Prior Publication Data

US 2025/0158411 A1 May 15, 2025

(51) Int. Cl.
*H02J 3/36* (2006.01)
*H02J 3/38* (2006.01)

(52) U.S. Cl.
CPC ............... *H02J 3/36* (2013.01); *H02J 3/381* (2013.01)

(58) Field of Classification Search
CPC ..................................... H02J 3/36; H02J 3/381
See application file for complete search history.

(56) References Cited

U.S. PATENT DOCUMENTS

| | | | |
|---|---|---|---|
| 2014/0146582 A1* | 5/2014 | Gupta ................. | H02M 7/7575 363/35 |
| 2014/0268926 A1* | 9/2014 | Gupta ................. | H02M 5/44 363/35 |
| 2015/0256094 A1* | 9/2015 | Chaudhuri ......... | H02M 7/7575 363/35 |
| 2017/0331390 A1* | 11/2017 | Xu ..................... | H02J 3/36 |
| 2021/0143754 A1* | 5/2021 | Cai .................... | H02M 7/7575 |

(Continued)

FOREIGN PATENT DOCUMENTS

| | | | |
|---|---|---|---|
| CN | 105162155 A | | 12/2016 |
| CN | 113452060 A | * | 9/2021 |
| CN | 117595347 A | * | 2/2024 |

OTHER PUBLICATIONS

Machine translation of CN 113452060, cited above. (Year: 2021).*

(Continued)

*Primary Examiner* — Fred E Finch, III (74) *Attorney, Agent, or Firm* — Addison D. Ault; IPGentleman Intellectual Property Services, LLC (57) ABSTRACT

The present invention provides a hybrid direct current transmission system and a control method thereof, which belongs to the field of power electronics. The system includes: the rectifier side circuit adopts a heterogeneous series topology structure, the high-voltage valve group adopts LCC to withstand high voltage levels, and the low-voltage valve group adopts MMC to establish and maintain the voltage stability of the grid connection point; the inverter side circuit adopts a distributed connection, wherein the high-voltage valve group adopts LCC, the low-voltage valve group adopts three parallel MMCs, and multiple inverters are distributedly connected to different AC circuits. The rectifier side is composed of LCC and MMC in series, and the inverter side is composed of three parallel MMCs and LCC in series that are distributedly connected to different AC circuits. In this way, the system can provide voltage support for the energy base, has AC and DC fault ride-through function, prevents phase change failure, and improves system stability. In addition, the distributed access method can also achieve flexible power distribution.

6 Claims, 6 Drawing Sheets

(56) References Cited

U.S. PATENT DOCUMENTS

2024/0333129 A1* 10/2024 Kikuchi .................. H02M 1/36
2025/0007281 A1* 1/2025 Xu ........................... H02J 3/36

OTHER PUBLICATIONS

Machine translation of CN 117595347, cited above. (Year: 2024).*
CNIPA first Office Action, CN202411398681.1, issued Nov. 20, 2024, pp. 1-4.
CNIPA first Office Action, CN202411398681.1, issued Nov. 20, 2024, English machine translation generated Feb. 13, 2025, pp. 1-6.

* cited by examiner

In the rectifier circuit, MA adopts dual-loop control consisting of a power outer loop and a current inner loop to generate trigger pulse signals for controlling each device in M; LC adopts constant DC current control, compares the current finger value and the current measured value, performs PI adjustment based on the comparison result, and controls the trigger angle of LC based on the adjustment result.

↓

The result is PI regulation, and the trigger angle of LC is controlled according to the regulation result. In the inverter side circuit, three groups of parallel NM adopt master-slave station switching coordinated control, one MM is set as the master station, adopts fixed DC voltage control and fixed reactive power control, and the other two MCs are slave stations, adopting fixed active power control and fixed reactive power control; LC adopts fixed DC voltage control, fixed DC current control and fixed cut-off angle control, and the maximum value is taken as the signal to control the trigger angle of L by comparing the output values of the three controls of fixed DC voltage, fixed DC current and fixed cut-off angle control.

HYBRID DIRECT CURRENT TRANSMISSION SYSTEM AND CONTROL METHOD THEREOF

TECHNICAL FIELD

The present invention belongs to the field of power electronics, and specifically relates to a hybrid direct current transmission system and a control method thereof.

Background Technology

With the proposal of new carbon emission goals, our society is in a critical period of energy structure transformation, gradually shifting from a fossil energy-dominated system to a modern energy system with clean energy as the core. Due to the geographical distribution characteristics of national energy and power load centers, most new energy sources need to be exported over long distances and on a large scale to meet the requirements. The use of high-voltage direct current transmission technology is an inevitable choice for realizing the transmission of Shagouhuang renewable energy base. At present, with the rapid development of the power system, high-voltage direct current transmission technology is also developing continuously.

In the existing technology, direct current transmission technology is a high-voltage direct current transmission (line commutated converter based high voltage direct current, LCC-HVDC) technology using a grid-commutated converter. This technology is very mature and has the advantages of low construction and operation costs, large capacity, and low loss. It has been widely used in long-distance cross-regional transmission occasions. However, there are also some limitations. For example, commutation failure is prone to occur on the inverter side. As the system's transmission power and voltage level continue to increase, the corresponding AC system strength will be relatively reduced. However, LCC itself does not have a self-commutation function and needs to be connected to an AC system with sufficient strength to ensure normal operation. As a result, when the LCC-HVDC system is connected to a weak AC system at the inverter end, it may face system instability problems such as commutation failure.

Disclosure

In order to solve the problem that the inverter side is prone to commutation failure, the present invention provides a hybrid DC power transmission system and a control method thereof.

In order to achieve the above-mentioned purpose, the present invention provides the following technical solutions:

A hybrid DC power transmission system, the system includes a rectifier side circuit and an inverter side circuit;

The rectifier side circuit includes a grid commutation converter LCC and a modular multilevel converter MMC connected in series;

The inverter side circuit includes an LCC and three parallel MMCs, and the LCC and the three parallel MMCs are connected in series;

The LCC of the rectifier side circuit and the LCC of the inverter side circuit are connected in series.

Optionally, the LCC includes a converter transformer and a 12-pulse converter, wherein the converter transformer is connected to the MMC, and the 12-pulse converter of the rectifier-side LCC is connected to the 12-pulse converter of the inverter-side LCC;

The 12-pulse converter includes two 6-pulse converters connected in series; the 6-pulse converter includes 6 first bridge arms in three phases abc, and each first bridge arm includes a half-controlled device thyristor; the converter transformer includes two transformers with different wiring modes, one is YA connection and the other is Yy connection; the two 6-pulse converters are respectively connected to two transformers with different wiring modes.

Optionally, the MMC adopts a modular multi-level structure, including 6 second bridge arms in three phases abc, each second bridge arm includes 1 inductor and multiple cascaded submodules; the submodule is a half-bridge submodule, including two IGBTs and a diode anti-parallel to the two IGBTs and a DC capacitor.

A hybrid DC transmission control method, applied to the hybrid DC transmission system described in claim 1, comprising:

In the rectifier side circuit, the MMC adopts a dual-loop control consisting of a power outer loop and a current inner loop to generate a trigger pulse signal for controlling each device in the MMC; the LCC adopts a constant DC current control, compares the current command value and the current measured value, performs proportional integral adjustment according to the comparison result, and controls the trigger angle of the LCC according to the adjustment result;

In the inverter side circuit, three groups of parallel MMCs adopt master-slave station switching coordinated control, one of the MMCs is set as the master station, adopts constant DC voltage control and constant reactive power control, and the other two MMCs are slave stations, adopting constant active power control and constant reactive power control; the LCC adopts constant DC voltage control, constant DC current control and constant shut-off angle control, and takes the maximum value as the signal for controlling the LCC trigger angle by comparing the output values of the three controls of constant DC voltage, constant DC current and constant shut-off angle control.

Optionally, the MMC adopts a dual-loop control consisting of a power outer loop and a current inner loop, and generates a trigger pulse signal for controlling each device in the MMC, including:

Using the output value of the outer loop control as the input value of the inner loop control, the inner loop control adopts PI control, and the control result is modulated by the nearest level approximation and the sorting method voltage equalization control to generate a trigger pulse signal for controlling each device in the MMC.

Optionally, in the inverter side circuit, the LCC also adopts a minimum arc extinction angle control strategy to prevent the arc extinction angle from being too small and causing commutation failure.

Optionally, in the case of a fault in the master control station, the first slave control station responds quickly and switches to the control mode of the master control station, switching from fixed active power control to fixed DC voltage control to maintain the voltage stability of the DC system; during the response process of the first slave control, the control mode of the second slave control station remains unchanged.

The hybrid DC power transmission system and control method provided by the present invention have the following beneficial effects:

The power transmission system proposed by the present invention adopts the structure of LCC and MMC in series on the rectifier side, which can realize the power delivery of large-scale new energy bases. The high-voltage valve group adopts LCC to withstand the high voltage level of the system. LCC has the ability of forced phase shifting and can suppress DC fault current through control strategy; the low-voltage valve group adopts MMC to establish and maintain the voltage stability of the grid connection point; the inverter side is composed of three parallel MMCs and LCCs in series connected to different AC circuits in a distributed manner, which has AC and DC fault crossing function to prevent phase switching failure, and multiple inverters are distributed to different AC circuits. Such a distributed access method can also realize flexible power distribution. In addition, the present invention also implements a control strategy for the operating principle of the topological structure of the above-mentioned rectifier side and inverter side, and prevents the master-slave switching of multiple MCCs in view of the complex coupling characteristics between multiple converter stations on the inverter side, thereby avoiding the phase switching failure caused by MCC failure.

FIGURES

In order to more clearly illustrate the embodiment of the present invention and its design scheme, the drawings required for this embodiment will be briefly introduced below. The drawings described below are only some embodiments of the present invention. For ordinary technicians in this field, other drawings can be obtained based on these drawings without creative work.

DETAILED DESCRIPTION

In order to enable those skilled in the art to better understand the technical solution of the present invention and implement it, the present invention is described in detail below with reference to the accompanying drawings and specific embodiments. The following embodiments are only used to more clearly illustrate the technical solution of the present invention, and cannot be used to limit the scope of protection of the present invention.

In the description of the present invention, it should be understood that the terms "center", "longitudinal", "lateral", "length", "width", "thickness", "up", "down", "front", "back", "left", "right", "vertical", "horizontal", "top", "bottom", "inside", "outside", "axial", "radial", "circumferential" and the like indicate the orientation or position relationship based on the orientation or position relationship shown in the drawings, which is only for the convenience of describing the technical solution of the present invention and simplifying the description, rather than indicating or implying that the device or element referred to must have a specific orientation, be constructed and operated in a specific orientation, and therefore cannot be understood as limiting the present invention.

In addition, the terms "first", "second" and the like are only used for descriptive purposes and cannot be understood as indicating or implying relative importance. In the description of the present invention, it should be noted that, unless otherwise clearly specified or limited, the terms "connected" and "connected" should be understood in a broad sense, for example, it can be a fixed connection, a detachable connection, or an integral connection; it can be a mechanical connection or an electrical connection; it can be a direct connection or an indirect connection through an intermediate medium. For ordinary technicians in this field, the specific meanings of the above terms in the present invention can be understood according to specific circumstances. In the description of the present invention, unless otherwise specified, "multiple" means two or more, which will not be described in detail here.

As the demand for converter performance in high-voltage direct current transmission continues to increase, a high-voltage direct current transmission technology using modular multilevel converters (MMC-HVDC) has emerged. This technology has the ability to connect to passive or weak AC networks, has low harmonic content, does not have the risk of commutation failure, and can flexibly control active and reactive power. Compared with LCC, MMC can realize the power transmission of large-scale new energy bases, and is widely used in large-scale new energy on land and offshore wind farms. It has become one of the effective solutions to the problems of new energy grid connection and power consumption. However, it has large losses during operation, high initial construction and installation costs, and the MMC converter using half-bridge submodules does not have the function of self-clearing DC faults.

Based on the above-mentioned MMC-HVDC technology, in order to further improve the reliability of DC transmission and reduce costs, the present invention proposes a hybrid DC transmission system. The rectifier side is composed of LCC (Line-Commutated Converter) and MMC (Modular Multilevel Converter) in series, and the inverter side is composed of three parallel MMCs and LCCs connected in series in a distributed manner to different AC systems. The system can provide voltage support for the Shagohuang renewable energy base, has AC and DC fault ride-through function, prevents commutation failure, and improves system stability. The distributed access method can realize flexible power distribution.

The technical solutions provided by various embodiments of the present invention are described in detail below in conjunction with the accompanying drawings.

Figure 1:
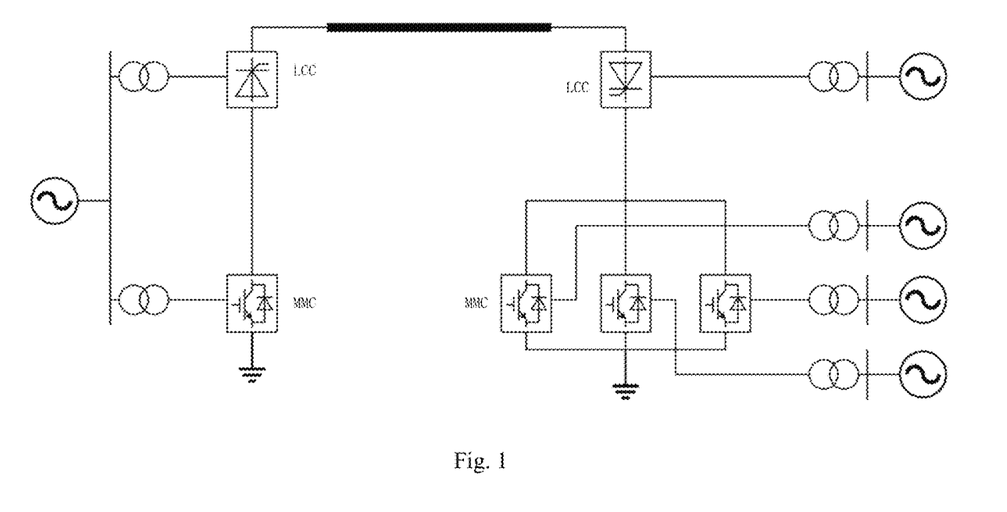
FIG. 1 is a schematic diagram of a hybrid DC transmission system provided by the present invention according to an exemplary embodiment.

First, the present invention provides a hybrid DC transmission system, as shown in FIG. 1, including:

A rectifier side circuit and an inverter side circuit; the rectifier side circuit is connected to the transmission network of the new energy base.

The rectifier side circuit includes a grid-commutated converter LCC and a modular multilevel converter MMC connected in series; the rectifier side LCC and MMC are respectively connected to the transmission network of the new energy base; the inverter side circuit includes an LCC and three parallel MMCs, and the LCC and three parallel MMCs are connected in series; the LCC of the rectifier side circuit and the LCC of the inverter side circuit are connected in series.

For example, the rectifier side circuit adopts a heterogeneous series topology structure, the high-voltage valve group adopts LCC to withstand the high voltage level, and the low-voltage valve group adopts MMC to establish and maintain the voltage stability of the grid connection point; the inverter side circuit adopts a distributed connection, wherein the high-voltage valve group adopts LCC, the low-voltage valve group adopts three parallel MMCs, and multiple inverters are distributedly connected to different AC circuits.

Based on the above structure, the rectifier side converter station adopts a heterogeneous series topology structure, which can realize the power delivery of the large-scale new energy base of Shagohuang, the high-voltage valve group adopts LCC to withstand the high voltage level of the system, and the low-voltage valve group adopts MMC to establish and maintain the voltage stability of the grid connection point. LCC has the ability to force phase shifting, and can suppress DC fault current through control strategies. In the inverter side converter station, high and low pressure valve groups are connected in a distributed manner, wherein the high pressure valve group selects LCC, and the low pressure valve group selects three parallel MMCs, and multiple converters on the inverter side are distributedly connected to different AC systems, which can realize flexible power distribution. At the same time, due to the existence of MMC, even if the LCC fails to change phase, the system can maintain a certain power supply capacity. This topology significantly improves the stability of the system.

Figure 2:
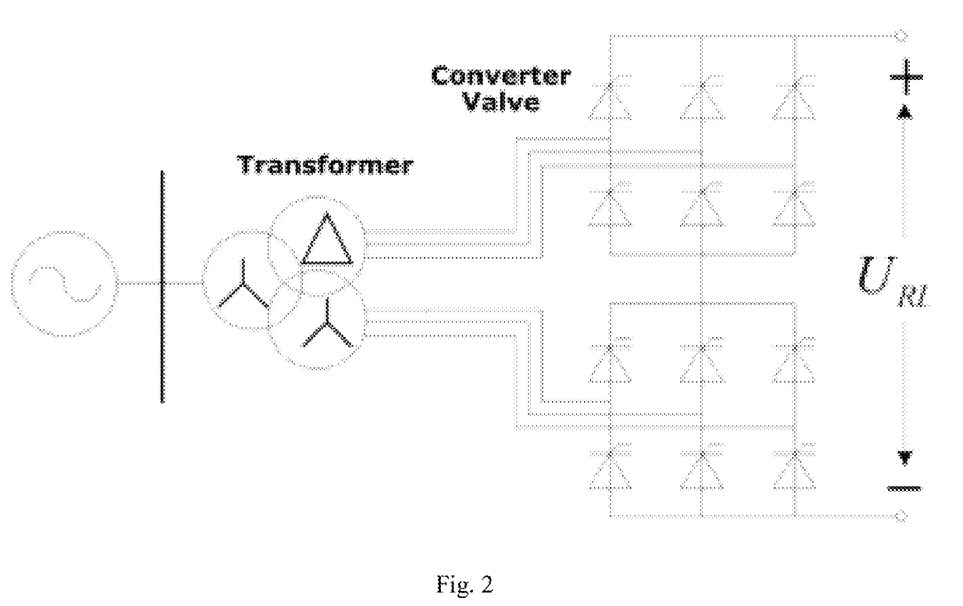
FIG. 2 is a schematic diagram of an LCC structure provided by the present invention according to an exemplary embodiment.

In one embodiment, the LCC includes a converter transformer and a 12-pulse converter, and the 12-pulse converter includes two 6-pulse converters connected in series; the 6-pulse converter includes a total of 6 first bridge arms of abc three phases, specifically 3 common cathode converter valves and 3 common anode converter valves, which are switched on and off in a specific order to convert AC power into DC power. This configuration allows the 6-pulse converter to generate 6 pulsations in a complete cycle, thereby effectively converting AC power into DC power. Each first bridge arm includes a half-controlled device thyristor; these half-controlled device thyristors are turned on and off according to a specific sequence and control strategy to achieve the conversion of AC to DC. The converter transformer has the functions of adjusting the trigger angle of the converter, electrical isolation between AC and DC, and voltage conversion. It includes two transformers with different wiring methods, one is YΔ connection and the other is Yy connection, with a phase difference of 30°, which can reduce the generation of harmonics in the converter; two 6-pulse converters are respectively connected to two transformers with different wiring methods, as shown in FIG. 2, where $U_{RL}$ is the DC voltage of the LCC on the rectifier side.

Figure 3:
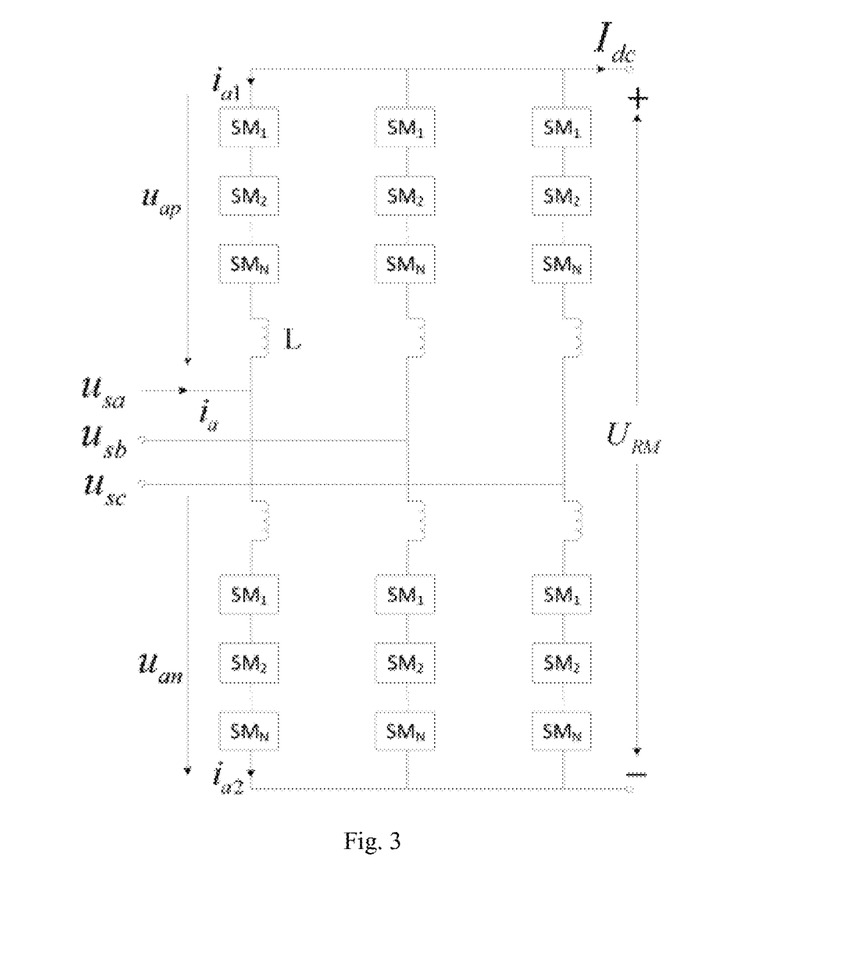
FIG. 3 is a schematic diagram of an MMC structure provided by the present invention according to an exemplary embodiment.
Figure 4:
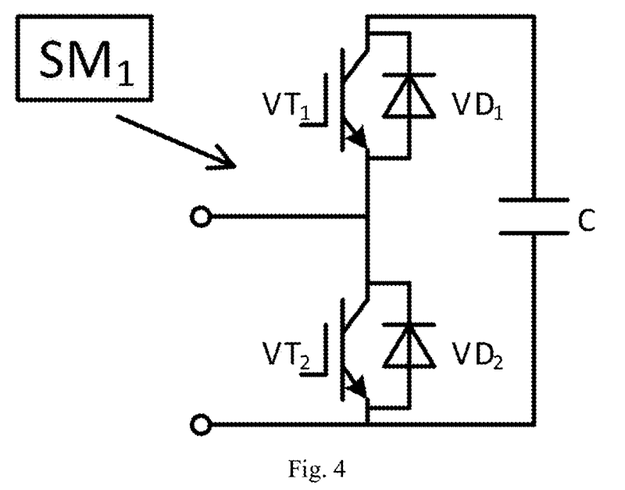
FIG. 4 is a schematic diagram of an MMC submodule structure provided by the present invention according to an exemplary embodiment.

In another embodiment, as shown in FIG. 3, the MMC adopts a modular multi-level structure, including a total of 6 second bridge arms of three phases abc, each second bridge arm includes an inductor and multiple cascaded submodules, and the inductor can suppress the unbalanced current generated between the second bridge arms; in addition, the submodule is a half-bridge submodule SM1, including two IGBTs and a diode $VD_1$ anti-parallel to the two IGBTs and a DC capacitor C, as shown in FIG. 4, where $VT_1$ and $VT_2$ are IGBTs.

Using the above system, the rectifier side is composed of LCC and MMC in series, and the inverter side is composed of three parallel MMCs and LCCs connected in series to different AC circuits in a distributed manner. In this way, the system can provide voltage support for the energy base, has AC and DC fault ride-through function, prevents phase change failure, and improves system stability. In addition, the distributed access method can also realize flexible power distribution.

Figure 5:
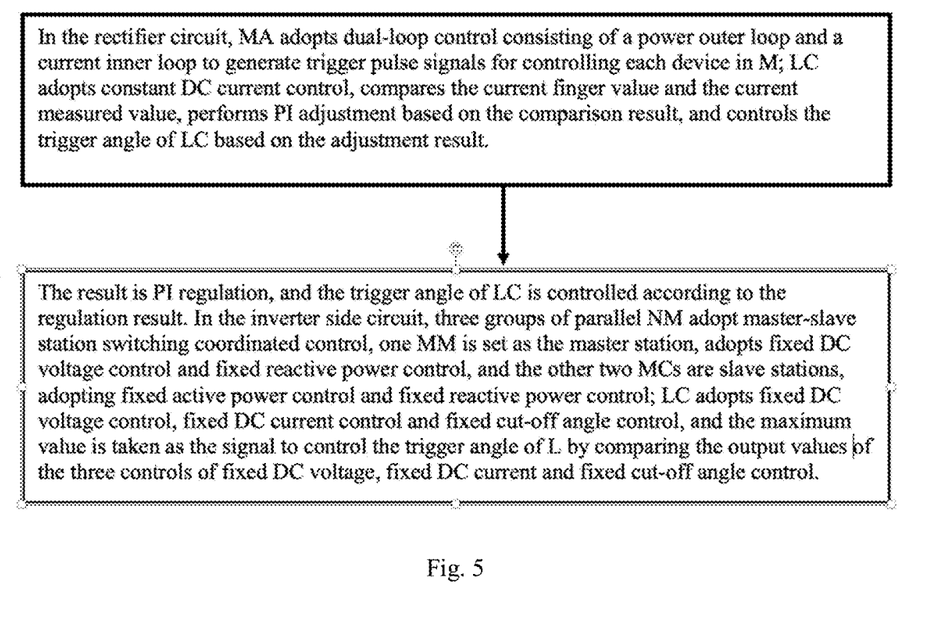
FIG. 5 is a schematic diagram of a hybrid DC transmission control method provided by the present invention according to an exemplary embodiment.

Secondly, the present invention also provides a hybrid DC power transmission control method, as shown in FIG. 5, comprising the following steps:

S501, in the rectifier side circuit, the MMC adopts a dual-loop control consisting of a power outer loop and a current inner loop to generate a trigger pulse signal for controlling each device in the MMC; the LCC adopts a fixed DC current control, compares the current command value and the current measured value, performs proportional integral adjustment according to the comparison result, and controls the trigger angle of the LCC according to the adjustment result.

Specifically, the outer loop control includes fixed active power control, fixed reactive power control and fixed DC voltage control, and the outer loop control output value of the power outer loop is used as the inner loop control input value of the current inner loop. The inner loop control adopts PI control, and the control result is modulated by the nearest level approximation and the sorting method voltage balancing control to generate a trigger pulse signal for controlling each device in the MMC.

For example, the MMC converter in the hybrid DC transmission system adopts vector control. The vector control usually adopts dual-loop control, that is, it is composed of a power outer loop and a current inner loop. This control is simple and has a fast response speed. The outer loop control includes fixed active power control, fixed reactive power control and fixed DC voltage control. The output values $i^*_d$ and $i^*_q$ of the outer loop control are the input values of the inner loop control. In the inner loop control, the output values $V^*_d$ and $V^*_q$ are used as the input values of the nearest level approximation modulation and the sorting method voltage-sharing control module, and finally generate the trigger pulse signal for controlling each device in the MMC. Among them, in order to ensure the stability of the system DC voltage, the MMC in the rectifier side circuit selects fixed DC voltage and fixed reactive power control.

Figure 6:
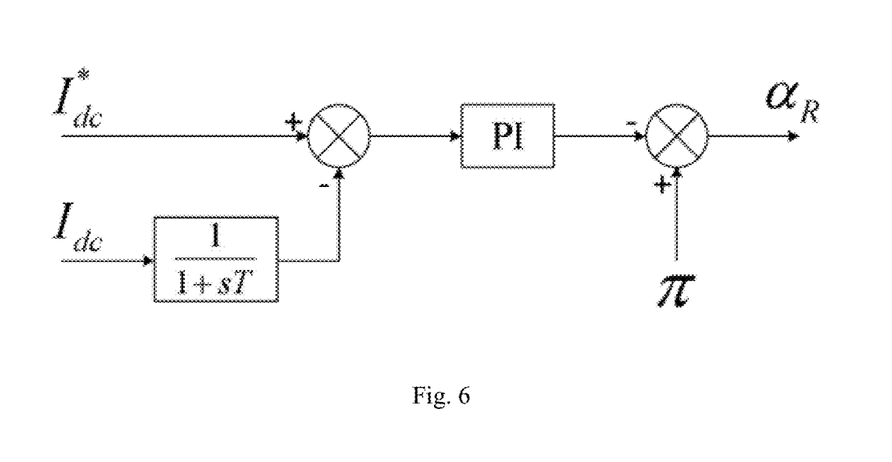
FIG. 6 is a schematic diagram of a rectifier-side LCC control method provided by the present invention according to an exemplary embodiment.

As shown in FIG. 6, on the rectifier side, the LCC converter works in fixed DC current control, $I^*_{dc}$, $I_{dc}$, and $\alpha_R$ represent the DC current command value, the DC current measured value, and the LCC trigger angle on the rectifier side, respectively. By comparing the values of $I^*_{dc}$ and $I_{dc}$ after PI adjustment, the trigger angle of LCC is controlled.

S502. In the inverter side circuit, three groups of parallel MMCs adopt master-slave station switching coordinated control, one of the MMCs is set as the master station, adopts fixed DC voltage control and fixed reactive power control, and the other two MMCs are slave stations, adopting fixed active power control and fixed reactive power control; LCC adopts fixed DC voltage control, fixed DC current control and fixed cut-off angle control, and by comparing the output values of the three controls of fixed DC voltage, fixed DC current and fixed cut-off angle control, the maximum value is taken as the signal for controlling the LCC trigger angle.

For example, in the inverter side circuit, three groups of parallel MMCs adopt the master-slave station switching coordinated control strategy, specify MMC1 among the three groups of MMCs as the master station, select fixed DC voltage and fixed reactive power control, MMC2 and MMC3 as slave stations, and select fixed active and fixed reactive power control. In order to facilitate analysis, the command values in the fixed reactive power control of MMC are all set to 0.

In addition, the LCC in the inverter side circuit adopts constant DC voltage, constant DC current, and constant shut-off angle control, and in order to prevent the arc extinction angle of the upper and lower bridges on the inverter side from being too small to cause commutation failure, a minimum arc extinction angle control strategy is also added. By comparing the output values of the three controls of constant DC voltage, constant DC current, and constant shut-off angle control, the maximum value is taken as the signal for controlling the LCC trigger angle. $\gamma I$, $I^*_{dc}$, $I_{dc}$, $U_{IL}$, $\alpha_R$ represent the measured value of the arc extinction angle of the upper and lower bridges on the inverter side, the DC current command value, the DC current measured value, the DC voltage command value, the DC voltage measured value, and the inverter side LCC trigger angle, respectively.

In a possible implementation, when the master control station fails, the first slave control station responds quickly and switches to the control mode of the master control station, switching from fixed active power control to fixed DC voltage control to maintain the voltage stability of the DC system; during the response process of the first slave control, the control mode of the second slave control station remains unchanged.

For example, in a hybrid DC transmission system, a permanent AC fault occurs at the inverter side MMC1 outlet, which will threaten the stability of the entire DC transmission system, and the power balance of the system will also be affected. The present invention proposes a master-slave station switching coordination control strategy suitable for parallel MMC converter stations in a hybrid DC transmission system. When a fault occurs, the master control station MMC1 exits operation due to the fault and loses the ability to control the system DC voltage. In order to ensure the stability of the system DC voltage, the slave control station MMC2 responds quickly and switches to the control mode of the master control station, switching from fixed active power control to fixed DC voltage control to maintain the voltage stability of the DC system and avoid system instability or failure caused by voltage fluctuations. During the whole process, the MMC3 control mode remains unchanged. At the same time, the output power originally borne by the inverter side MMC1 is jointly borne by MMC2 and MMC3.

In order to further illustrate the present invention, a mathematical model can also be established according to the characteristics of the topological structure of the hybrid DC transmission system, and the operating principle and control strategy are deeply studied according to the mathematical model. At the same time, the interaction mechanism analysis is further conducted for the complex coupling characteristics between multiple converter stations on the inverter side.

Specifically, before controlling the hybrid DC transmission system, it is necessary to construct a transmission parameter model for the hybrid DC transmission system, including:

The DC voltage of the LCC on the rectifier side is $U_{RL}$, the DC voltage of the MMC on the rectifier side is $U_{RM}$, the DC voltage of the LCC on the inverter side is $U_{IL}$, the DC voltage of the MMC on the inverter side is $U_{IM}$, the system DC current is $I_{dc}$, and assuming that the DC line resistance is R, the voltage equation model of the entire system is:

$$U_{RL} + U_{RM} = I_{dc}R + U_{IL} + U_{IM}.$$

The active power output of LCC is $P_{RL}$, the reactive power is $Q_{RL}$, and the transmission parameter equation model of the LCC on the rectifier side is as follows:

$$U_{RL} = \frac{6\sqrt{2}}{\pi}E_{RL}\cos\alpha_R - \frac{6}{\pi}X_{RL}I_{dc}.$$

$$P_{RL} = U_R I_{dc}.$$

$$Q_{RL} = P_{RL}\tan\varphi_R.$$

$$\cos\varphi_R = \frac{\cos\alpha_R + \cos(\alpha_R + \mu_R)}{2}.$$

Among them, $E_{RL}$ is the effective value of the no-load line voltage on the valve side, XRL is the commutation reactance, $\alpha_R$ is the trigger angle, $\mu_R$ is the commutation angle, and $\varphi_R$ is the power factor angle.

In FIG. 3 above, $U_{RM}$ is the DC voltage value of the MMC output on the rectifier side, and $u_{sa}$, $u_{sb}$ and $u_{sc}$ are the input voltages of phase a, phase b and phase c respectively. Since the three-phase structure of MMC is highly symmetrical, phase a is taken as the research object for analysis, and the mathematical expression is as follows:

$$i_a = -i_{a1} + i_{a2}$$

Among them, $i_a$ is the current of phase a on the MMC AC side, $i_{a1}$ is the current of the upper bridge arm of phase a on the MMC AC side, and $i_{a2}$ is the current of the lower bridge arm of phase a on the MMC AC side.

$$u_{sa} = \frac{U_{RM}}{2} - u_{ap} = \frac{U_{RM}}{2} - u_{a1} - L\frac{di_{a1}}{dt}$$

$$u_{sa} = u_{an} - \frac{U_{RM}}{2} = L\frac{di_{a2}}{dt} + u_{a2} - \frac{U_{RM}}{2}$$

Among them, $u_{ap}$ and $u_{an}$ are the upper bridge arm and lower bridge arm voltages respectively, $u_{a1}$ and $u_{a2}$ are the upper bridge arm and lower bridge arm submodule output voltages respectively, and L is the bridge arm inductance.

In order to facilitate the analysis of the mathematical model of MMC, the bridge arm inductance is ignored, and the following can be obtained:

$$i_{a1} = -\frac{1}{3}I_{dc} - \frac{1}{2}i_a$$

$$i_{a2} = -\frac{1}{3}I_{dc} + \frac{1}{2}i_a$$

$$U_{RM} = u_{a1} + u_{a2}$$

From the above formula, it can be concluded that the voltage of the upper bridge arm and the voltage of the lower bridge arm together constitute the DC side voltage.

The above control method is applied to the hybrid DC transmission system proposed in the present invention. The rectifier side adopts the structure of LCC and MMC in series, which can realize the power delivery of large-scale new energy bases. The high-voltage valve group adopts LCC to withstand the high voltage level of the system. LCC has the ability of forced phase shifting and can suppress DC fault current through control strategy; the low-voltage valve group adopts MMC to establish and maintain the voltage stability of the grid connection point; the inverter side is composed of three parallel MMCs and LCCs in series connected to different AC circuits in a distributed manner, which has AC and DC fault crossing function to prevent phase switching failure, and multiple inverters are distributed to different AC circuits. Such a distributed access method can also realize flexible power distribution. In addition, the present invention also implements a control strategy for the operating principle of the topological structure of the above-mentioned rectifier side and inverter side, and prevents the master-slave switching of multiple MCCs for the complex coupling characteristics between multiple converter stations on the inverter side. The problem of phase switching failure caused by MCC failure is avoided.

It should be pointed out that the above specific implementation method can enable those skilled in the art to more fully understand the invention, but it does not limit the invention in any way. Therefore, although this specification has described the invention in detail, those skilled in the art should understand that the invention can still be modified or replaced by equivalents; and all technical solutions and improvements that do not deviate from the spirit and scope of the invention are included in the protection scope of the patent for the invention. Any figure mark in the claims should not be regarded as limiting the claims involved.

The invention claimed is:

1. A hybrid DC power transmission control method employing the hybrid DC power transmission which comprises a rectifier side circuit and an inverter side circuit, wherein:
the rectifier side circuit includes a grid commutation converter LCC and a modular multilevel converter MMC connected in series;
the inverter side circuit includes an LCC and three parallel MMCs, and the LCC and the three parallel MMCs are connected in series; and
the LCC of the rectifier side circuit and the LCC of the inverter side circuit are connected in series,
the method comprises:
in the rectifier side circuit, the MMC adopts a dual-loop control consisting of a power outer loop and a current inner loop to generate a trigger pulse signal for controlling each device in the MMC; and
the LCC adopts a constant DC current control, compares the current command value and the current measured value, performs proportional integral adjustment according to the comparison result, and controls the trigger angle of the LCC according to the adjustment result;
wherein, in the inverter side circuit, three groups of parallel MMCs adopt master-slave station switching coordinated control, one of the MMCs is set as the master station, adopts constant DC voltage control and constant reactive power control, and the other two MMCs are slave stations, adopting constant active power control and constant reactive power control;
wherein the LCC adopts constant DC voltage control, constant DC current control and constant shut-off angle control, and takes the maximum value as the signal for controlling the LCC trigger angle by comparing the output values of the three controls of constant DC voltage, constant DC current and constant shut-off angle control.

2. The hybrid DC power transmission control method of claim 1, wherein the MMC adopts a dual-loop control consisting of a power outer loop and a current inner loop, and the generation of a trigger pulse signal for controlling each device in the MMC includes:
Using the outer loop control output value of the power outer loop as the inner loop control input value of the current inner loop, wherein the inner loop control adopts PI control, and the control result is subjected to the nearest level approximation modulation and sorting method voltage balancing control to generate a trigger pulse signal for controlling each device in the MMC.

3. The hybrid DC power transmission system of claim 1, wherein, in the inverter side circuit, the LCC also adopts a minimum arc extinction angle control strategy to prevent the arc extinction angle from being too small and causing commutation failure.

4. The hybrid DC power transmission system of claim 1, wherein, in the case of a fault in the master control station, the first slave control station responds quickly, switches to the control mode of the master control station, and switches from fixed active power control to fixed DC voltage control to maintain the voltage stability of the DC system;
wherein, during the response process of the first slave control, the control mode of the second slave control station remains unchanged.

5. The hybrid DC power transmission system of claim 1, wherein the LCC comprises a converter transformer and a 12-pulse converter, the converter transformer is connected to the MMC, and the 12-pulse converter of the rectifier-side LCC is connected to the 12-pulse converter of the inverter-side LCC;
wherein, the 12-pulse converter comprises two 6-pulse converters connected in series; the 6-pulse converter comprises 6 first bridge arms of three phases abc, and each first bridge arm comprises a half-controlled device thyristor; the converter transformer comprises two transformers with different wiring modes, wherein one is a YΔ connection and the other is a Yy connection; and the two 6-pulse converters are respectively connected to two transformers with different wiring modes.

6. The hybrid DC power transmission system of claim 1, wherein the MMC adopts a modular multi-level structure comprising 6 second bridge arms of three phases abc, and each second bridge arm comprises 1 inductor and multiple cascaded submodules;
wherein the submodule is a half-bridge submodule, comprising two IGBTs and a diode anti-parallel to the two IGBTs and a DC capacitor.

* * * * *